US006481954B1

(12) United States Patent
Benuzzi

(10) Patent No.: US 6,481,954 B1
(45) Date of Patent: Nov. 19, 2002

(54) METHOD AND DEVICE FOR FEEDING PANELS TO A PANEL SAW MACHINE

(75) Inventor: Piergiorgio Benuzzi, Bologna (IT)

(73) Assignee: Giben Impianti S.p.A., Pianora (IT)

( * ) Notice: Subject to any disclaimer, the term of this patent is extended or adjusted under 35 U.S.C. 154(b) by 0 days.

(21) Appl. No.: 09/308,450

(22) PCT Filed: Oct. 13, 1998

(86) PCT No.: PCT/IB98/01609

§ 371 (c)(1), (2), (4) Date: May 19, 1999

(87) PCT Pub. No.: WO99/20441

PCT Pub. Date: Apr. 29, 1999

(30) Foreign Application Priority Data

Oct. 16, 1997 (IT) ........................................ B097A0620

(51) Int. Cl.[7] ................................................ B65G 60/00

(52) U.S. Cl. ................. 414/801; 144/245.7; 144/248.3; 414/796; 414/796.8; 414/788.4

(58) Field of Search ............................. 414/788.4, 796, 414/796.8, 801; 144/245.7, 547, 548, 548.3

(56) References Cited

U.S. PATENT DOCUMENTS 3,844,426 A * 10/1974 Campbell ............ 144/245.7 X
3,908,836 A * 9/1975 Ikeda ...................... 414/788.4
4,682,639 A * 7/1987 Takada et al. ....... 144/245.7 X
4,988,265 A * 1/1991 Schwab et al. .......... 414/796.8
5,205,705 A * 4/1993 Jenkner ................... 414/796.8
5,641,266 A * 6/1997 Lehtimäki ................... 414/796
5,924,839 A * 7/1999 Dopke et al. ............... 414/796

FOREIGN PATENT DOCUMENTS

DE 4140280 * 7/1992
DE 4320397 * 1/1994
EP 106019 * 4/1984
GB 335344 * 9/1930

* cited by examiner

*Primary Examiner*—Janice L. Krizek
(74) *Attorney, Agent, or Firm*—Fay, Sharpe, Fagan, Minnich & McKee, LLP

(57) ABSTRACT

The feeding method concerns the transfer of panels (2) from the top of a vertical stack (17) to a loading table (4) on a panel saw machine. The panels (2) are pushed by mobile horizontal pushers (7) from the stack (17) until they arrive at an infeed device (8) which conveys the panels (2) to the loading table (4). The pushers (7) and the vertical stack (17) perform relative movements controlled by control means (70), so as to allow the pushers (7) to transfer from the stack (17) one or more panels (2), depending on the extent (h) of the relative translation. The infeed device (8) comprises at least two pairs of rollers, each pair comprising a motor-driven roller and an idler roller. The center distance of a pair of rollers may be adjusted by adjusting the idler roller.

6 Claims, 6 Drawing Sheets

METHOD AND DEVICE FOR FEEDING PANELS TO A PANEL SAW MACHINE

TECHNICAL FIELD

The present invention relates to panel saws in general and, in particular, to a method for feeding panels to a panel saw machine.

BACKGROUND ART

In the furniture industry, panel saw machines are used to cut large rough-hewn panels to obtain suitably shaped smaller, semi-finished or finished panels.

Before being cut, the panels are stacked on a loading table on the panel saw machine so as to form regular geometrical stacks, in which the number of panels corresponding with a precise cutting pattern is selected according to the number of items of furniture to be produced.

The stacks which are gradually formed on the loading table on the machine are obtained from a large stack located at a loading station further upstream and on a feed line which comprises, one after another, the loading station, the loading table and the cutting station of the panel saw machine.

The rough-hewn panels are essentially fed from the loading station to the loading table on the panel saw machine using two different pick up and transfer techniques. The first envisages moving the various panels by means of sliding, transversal to the stack, of the top panel, which is translated resting on the panel immediately beneath it. In contrast, the second technique envisages the pick up and transfer of the panels which reach the top of the stack, using vacuum pick up means.

In the technique which envisages the sliding of the panels resting on the stack, the panels are picked up and transferred following a preparatory stage during which the panel to be transferred is first lifted slightly above the stack, using vacuum pick up means applied to one side of the panel. The panel is then intercepted by a horizontally mobile mechanical pusher, which pushes it and feeds it along the feed line, the panel resting on the stack until it arrives at an infeed device, preferably of the type with rollers positioned opposite one another.

The infeed device transfers the panels received and sends them in series over the loading table on the panel saw machine. When the panels reach the upright of the loading table, they are released by the infeed device and drop, under their own weight, being deposited one on top of another on the loading table, where suitable aligning means tidy the stack as it is formed.

When the preset number of panels is present in the stack, suitable transfer means transfer the stack to the panel saw machine for machining.

With the infeed technique that uses the vacuum pick up means only, the individual panels are first picked up from the top of the stack, until they are completely separated from it, then transferred by a mobile carriage, which mounts the pick up means, over the loading table on the panel saw machine, where they are allowed to drop under their own weight.

The two operating methods described above each have a specific field of application. The technique which envisages sliding of the panels is used almost exclusively for very thick panels, which are intrinsically rigid. In contrast, the specific application of the technique envisaging panel pick up and transfer using vacuum means is for feeding thin, highly flexible panels.

The basic disadvantage of such solutions is that they require total cycle times which are negatively affected by the operating times of the vacuum pick up systems, although to different degrees in the two above-mentioned solutions.

This disadvantage is particularly noticeable when feeding thin panels to panel saw machines set up to perform fairly simple cutting patterns. In this case, since the panel saw machine can carry out high speed machining, in less time than is required to form the stack of panels to be fed into it, the resulting disadvantage is discontinuous machining by the panel saw machine, since it cannot be continuously fed and so must stop to await the arrival of new panels.

Another disadvantage of both solutions is that only one panel at a time can be picked up and transferred from the stack; again, this means that the panel saw machine may have to wait until formation of the stack of panels to be machined is completed.

A further disadvantage is the fact that, at present, panel saw machines are fed using systems that are structured to function according to one technique or the other, meaning that it is not normally possible to pick up and transfer rigid and thin panels on the same feed line. To overcome this disadvantage, some known systems envisage the use of twin feed devices, structured according to one pick up and transfer technique or the other, alternating in their operation on the feed line, depending on the type of panels to be fed. However, due to the more complex construction and control, this solution is not always economically feasible.

DISCLOSURE OF THE INVENTION

The aim of the present invention is, therefore, to overcome the above-mentioned disadvantages.

In accordance with the present invention, said aim is achieved by a method for feeding panels to a panel saw machine which comprises a transfer step during which the panels of a vertical stack are transferred in series from the top of the stack to a loading table on the panel saw machine. The transfer step comprises a translation of the panels along a feed line, the initial section of which is covered by the panels, pushed by a horizontally mobile pusher, until they arrive at an infeed device with opposite rollers. A final section of the feed line, between the infeed device and the loading table on the panel saw machine, is covered by the panels under the action of the infeed device. The method is characterised in that the pusher element and vertical stack perform a relative translation, transversal to the feed line, involving movements whose extent is controlled by control means, so as to allow the pusher element to make contact with one or more panels forming packs of panels, positioned one on top of another, determined according to the extent h of the translation, and transfer them from the stack.

The technical characteristics of the present invention, in accordance with the above-mentioned aims, are apparent in the claims herein and are described in more detail with reference to the accompanying drawings, which illustrate a preferred embodiment, without limiting the scope of its application, and in which:

FIGS. 1 and 2 are respectively an elevation view and a plan view of a line for feeding panels to a panel saw machine;

FIGS. 1*a* and 3 are scaled up views of several details of the feed line;

Figure 1:
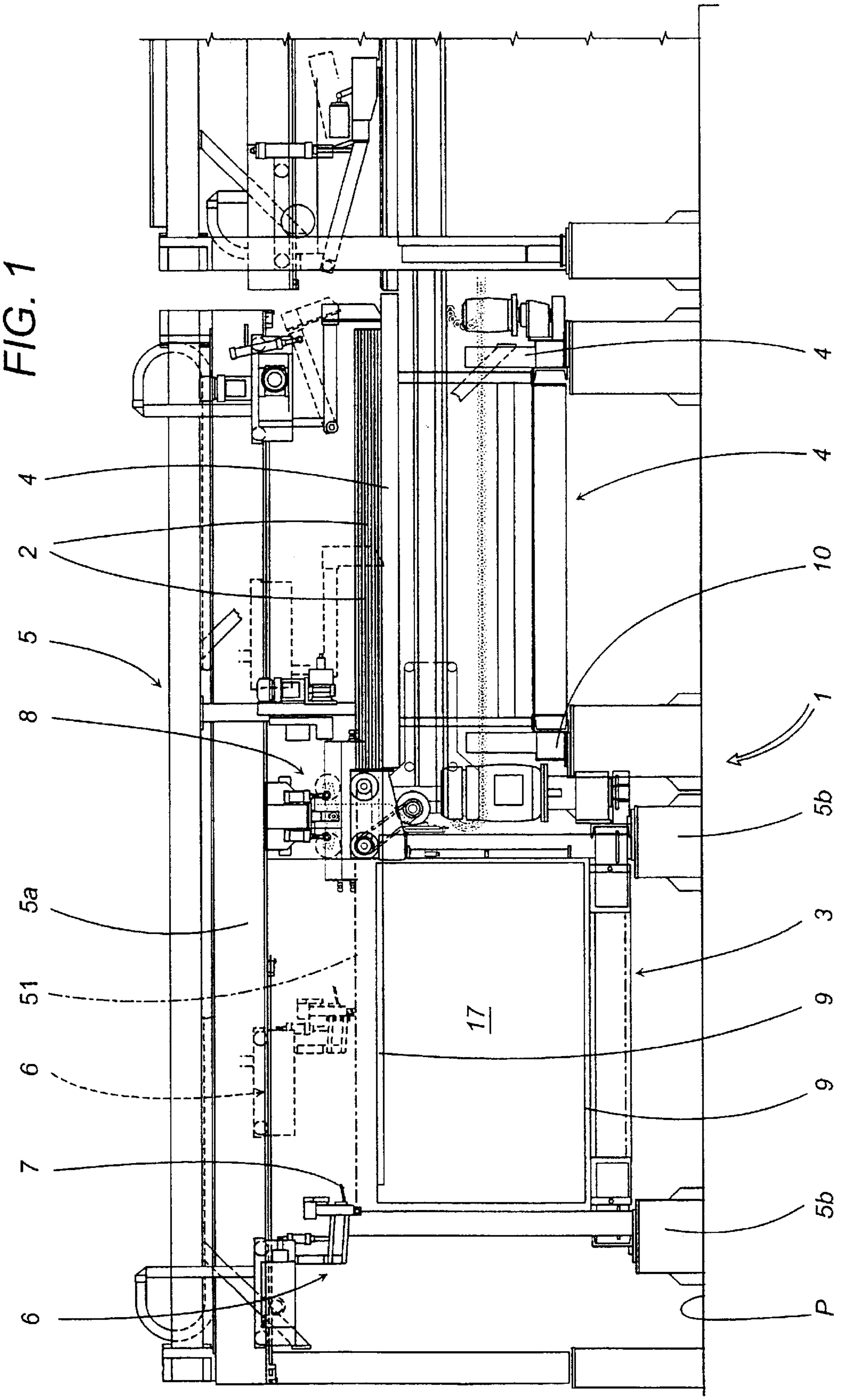
Figure 2:
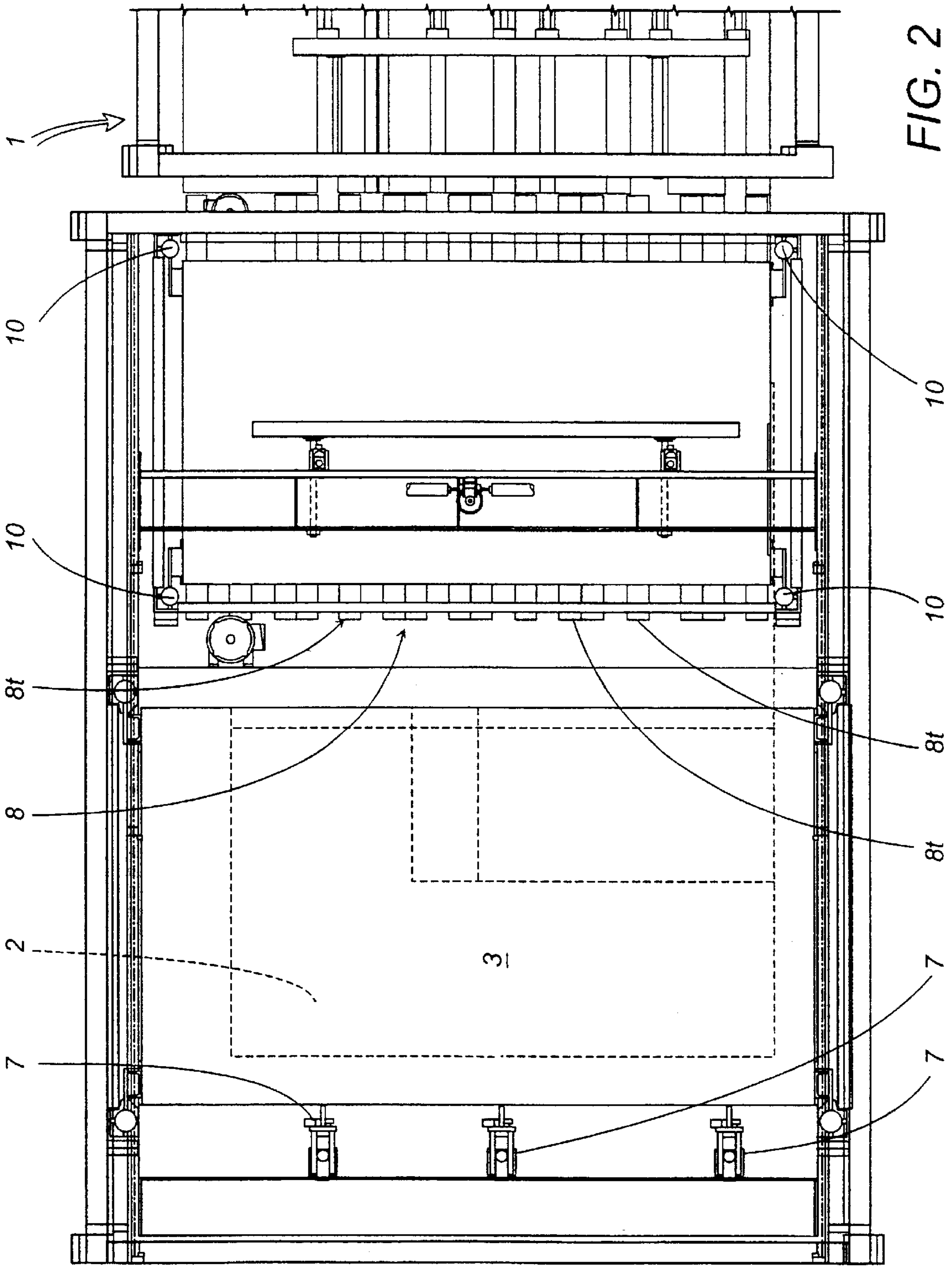

With reference to the accompanying drawings, and in particular FIGS. 1 and 2, the numeral 1 indicates as a whole a feed line for automatically feeding panels 2 to a panel saw machine, not completely illustrated since it does not form part of the subject matter of the present invention.

The feed line 1 essentially comprises a loading station 3 for the panels 2 and a loading table 4 on the panel saw machine, located one after another and beneath a structure 5 with a horizontal frame 5*a*.

The loading station 3 comprises a horizontal platform 9, guided vertically on a structure 5*b* fixed to the stand P, and motor-driven so that it can move between two end positions, respectively corresponding with a condition in which the platform 9 is fully lowered and a condition in which it is fully raised off the ground. The platform 9 is designed to receive a vertical stack 17 of rough-hewn panels 2, one on top of another, and is designed to move the stack 17 upwards, with short strokes alternating with pauses. The stack 17 strokes and pauses are effected on the basis of state switching signals sent by a photocell 51 located, relative to the stack 17, in a suitable position and at a height at which it is periodically intercepted by the top panel 2 on the stack 17. The horizontal frame 5*a* supports the guide for a carriage 6 which is horizontally mobile above the loading station 3 and is equipped with a set of parallel mechanical pushers 7 (see FIG. 2).

The pushers 7 are supported by support arms, labelled 52 as a whole, which are jointed in such a way as to allow vertical raising and lowering of the pushers 7 relative to the platform 9 of the loading station 3.

Figure 1A:
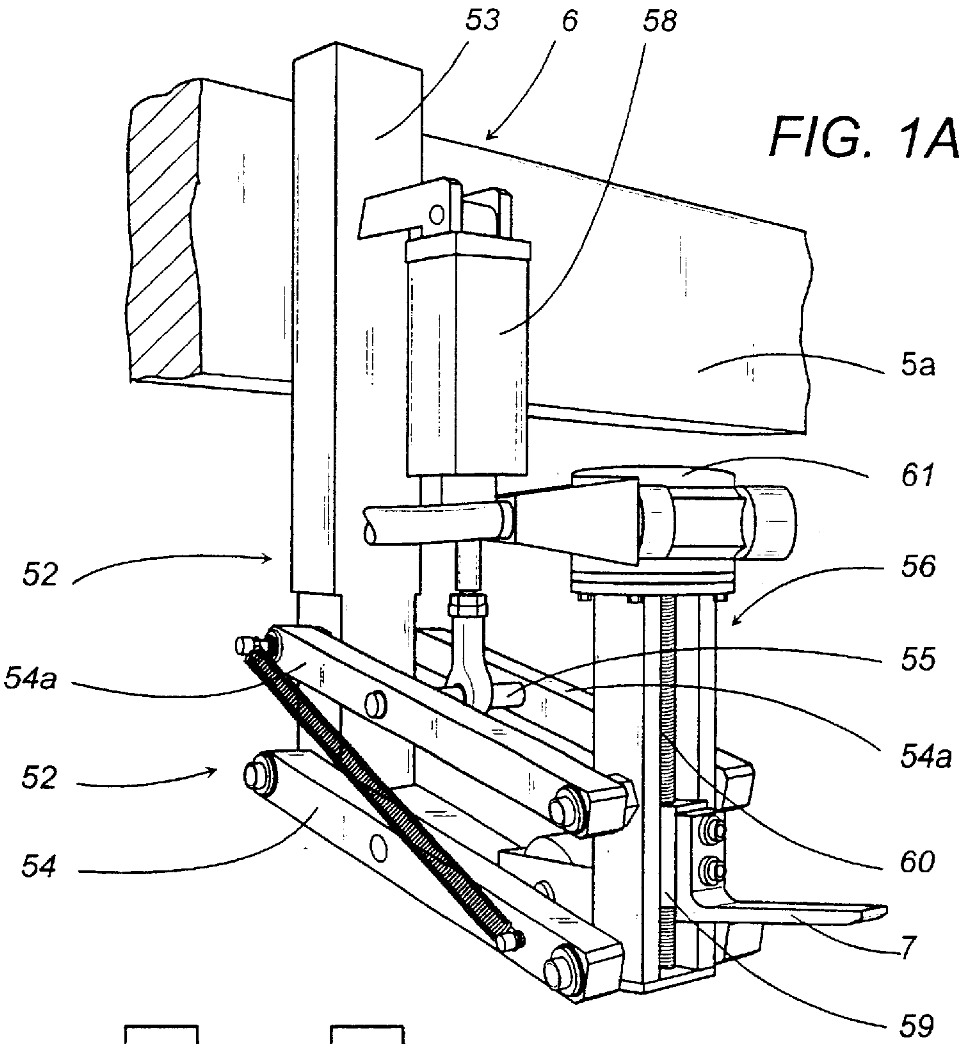

More specifically, the arms 52 comprise a support element 53 and a vertical guide 56 connected by two pairs of parallel, jointed connecting rods 54 arranged so that, together with the support element 53 and vertical guide 56, they form a four-bar linkage assembly. The arms 52 also comprise a cross-member 55 which connects two of the connecting rods, the upper pair labelled 54*a* in FIG. 1*a*. A hydraulic piston 58 is connected to the cross-member, its action allowing the configuration of the quadrilateral to be varied. A shoe 59, integral with the pushers 7, is mounted in such a way that it can slide in the guide 56. A motor-driven screw 60 controlled by an angular resolver (encoder) 61 is attached to the shoe 59 and imparts to the latter controlled sliding movements whose extent can be modulated along the guide 56.

The hydraulic piston 58, motor-driven screw 60 and encoder 61 together define first actuator means with which the pushers 7 may be first positioned at a height correlated with the photocell 51, then moved towards the platform 9, to delimit on the stack 17 a micrometrically controlled height h of panels 2, to be transferred from the top of the stack 17 to the panel saw machine. The loading table 4 on the panel saw machine is supported by four motor-driven screws 10 (again see FIG. 2), equipped with angular resolvers 62, or equivalent systems for detecting positions. The motor-driven screws 10 which together with, for example, without limiting the devices which may be used, the encoders 62, define second actuator means, are positioned at right angles to the loading table 4, being located at the corners of the table 4 and controlled in such a way that they impart to the loading table 4 intermittent, gradual translational motion, with short strokes whose extent is controlled between two end positions, in which the loading table 4 is respectively fully raised off the ground and fully lowered.

The translational motion of the loading table 4 is effected when a command is issued to the motor-driven screws 10, due to a signal corresponding to a panel 2 covering the photocell 63 located at the loading table 4 fully raised position.

Figure 3:
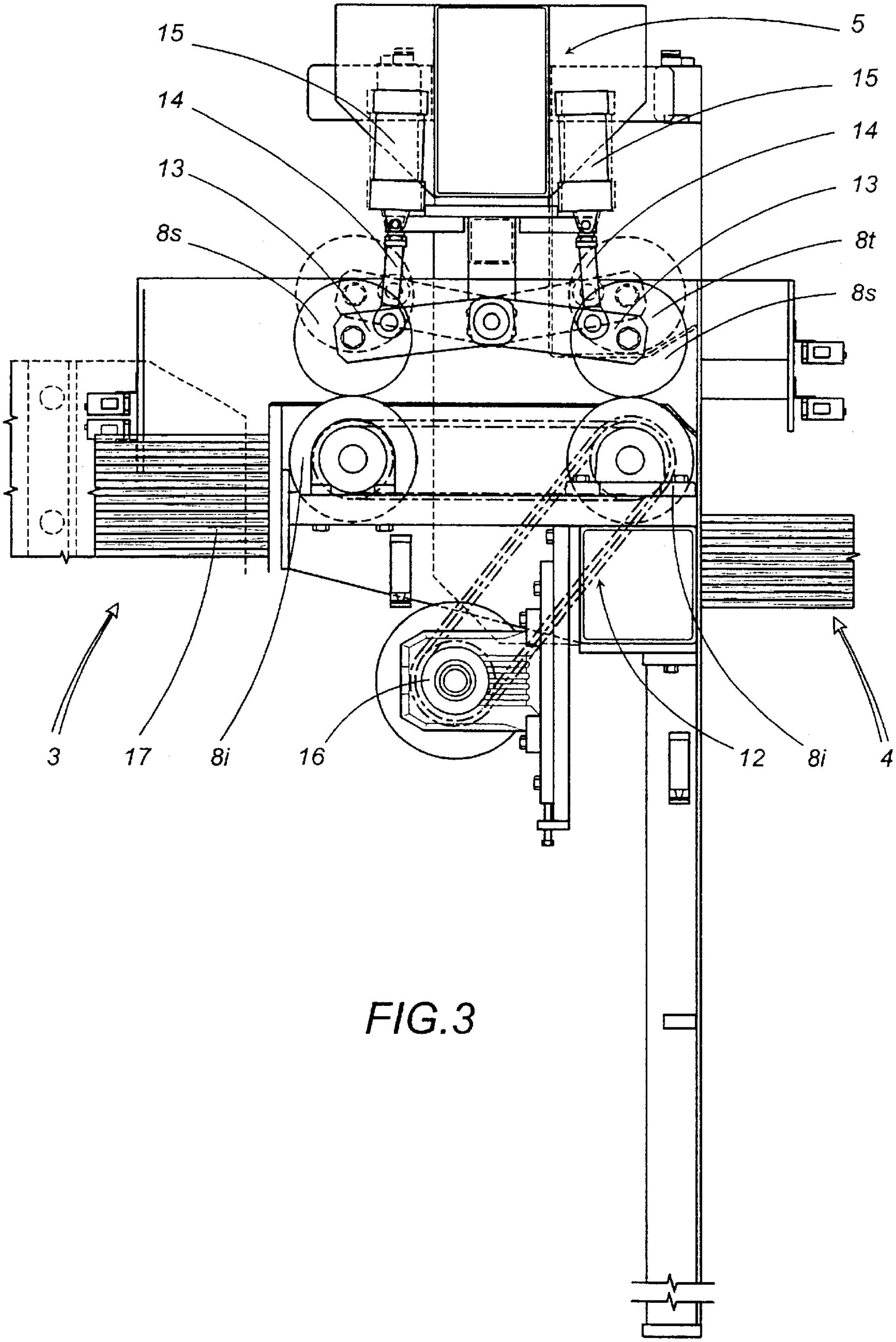

Between the loading station 3 and the loading table 4 of the panel saw machine, the feed line 1 comprises an infeed device 8 (see FIGS. 2 and 3) equipped with a plurality of units 8*t* arranged in series across the feed line 1. Each of the units 8*t* comprises four horizontal rollers 8*s*, 8*i* which form two pairs of vertically overlapping rollers, which are moved along the feed line 1.

Figure 4:
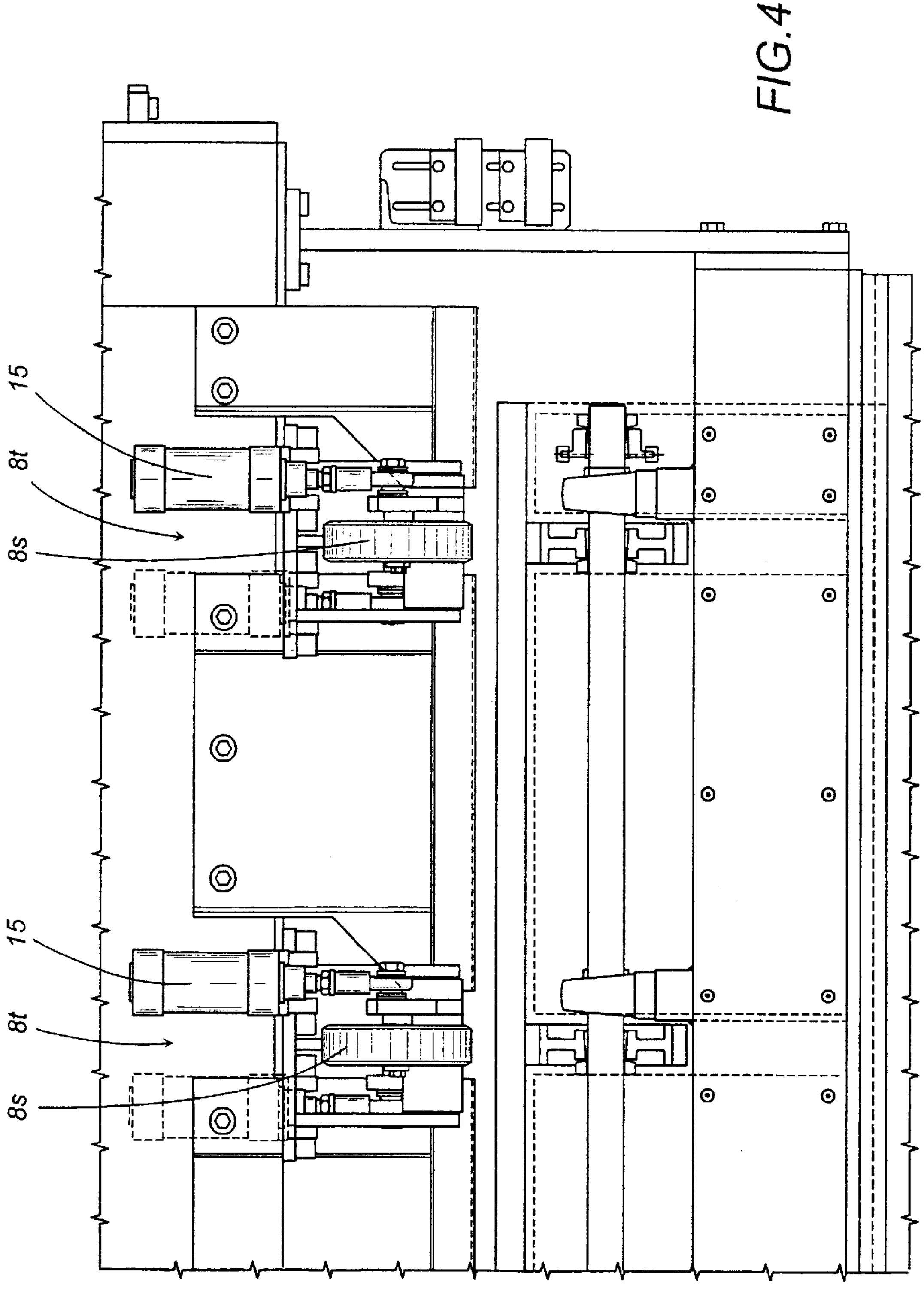
FIG. 4 is a scaled up side view of a detail from FIG. 3, with some parts cut away to better illustrate others.

The lower rollers 8*i* of the infeed device 8 are fixed on the structure 5 and driven, using belt or chain drives 12, by a shared motor 16 (see FIG. 4). The upper rollers 8*s* are fitted on the ends of arms 13, attached to the frame 5 of the feed line 1, and are attached to the rods 14 of hydraulic pistons 15 which are the third actuator means of the feed line 1. The action of the pistons 15 allows the upper rollers 8*s* of the infeed device 8 to be raised or lowered on the frame 5, so that they can be moved towards or away from the fixed rollers 8*i*, pressing any panels 2 between them against the fixed rollers.

Figure 5:
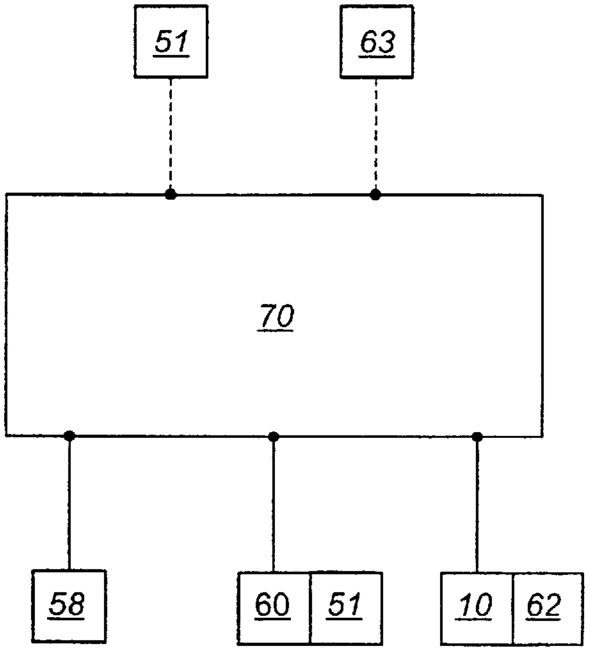
FIG. 5 is a block diagram illustrating the functional interconnections between some of the components of the feed line.

Finally, the feed line 1 comprises general control means 70 (see FIG. 5), of the programmable type, which are interconnected with the actuator means and the photocells 51, 63 (which identify more general sensor means), so as to automatically control all of the operating sequences of the feed line 1.

The described device can be used to carry out a method for feeding panels 2 to a panel saw machine, comprising the steps of: engaging with a pusher 7 a pack of panels 2 belonging to a vertical stack 17; moving said pack of panels 2 by means of said pusher 7 to an infeed device 8 having opposite rollers 8*s*, 8*i*; translating vertically a loading table 4, located next to the infeed device 8 and defining a space into which the pack can be deposited; and feeding the stack to the loading table 4 by means of the infeed device 8. The step of engaging with a pusher 7 a pack of panels 2 is performed after a step of moving vertically the stack relatively to the pusher 7. The method also comprises a step of controlling the vertical movement of the stack relatively to the pusher 7 by control means 70.

In practice, operation of the feed line 1 for feeding the panel saw machine is described starting from a starting condition, in which the carriage 6 is translated on the frame 5*a* until it is at the side of the loading station 3, at a distance from the loading point 4 controlled according to the size of the panels of which the stack 17 consists (maximum distance from loading table 4 on the panel saw machine), as illustrated in FIG. 1.

In the starting condition, a vertical stack 17 of panels 2 to be cut is placed on the platform 9 in the loading station 3. The platform 9, controlled by the feed line 1 control means 70, is translated vertically upwards, in a controlled fashion, until it is in a condition in which at least the top panel 2 of the stack 17 is higher than the pushers 7.

When the photocell 51 is covered, the upstroke of the stack 17 is stopped. The pushers 7 are then lowered so that they are below the photocell 51, alongside the stack 17, until they are lower than the top of the stack 17 by a measurement h determined according to the parameters programmed in the control means 70 depending on the unit thickness of the panels 2 and the number of panels 2 to be transferred from the stack 17 to the panel saw machine. When a suitable command has been issued by the control means 70, the carriage 6 translates along the frame 5*a*, drawing the pushers 7. The latter, making contact with the stack 17 at the preset height h, transfer the top panel 2, or a set of top panels 2, causing them to translate, transversal to the stack 17, along an initial section of the feed line 1 as far as the infeed device 8.

The infeed device 8 makes contact with the panel 2 or set of panels 2 received, gripping them between the first pair of rollers 8*s*, 8*i* thanks to the thrust exerted by the upper rollers 8*s* against the opposing action of the fixed lower rollers 8*i*.

When this condition is reached, whilst the stroke of the carriage 6 is inverted and it returns to its initial position with the pushers 7 raised from the stack 17 by the action of the first actuator means 58, the infeed device 8 transfers the panel 2 (or set of panels) picked up, sending it along a final section of the feed line 1 until it is above the loading table 4 on the panel saw machine.

When it reaches the upright of the loading table 4, the panel 2 is released by the infeed device 8 and drops, under its own weight, onto the loading table 4 on the panel saw machine, where it joins the vertical stack of panels 2 previously deposited.

Since the feed line 1 control means 70 can control both the vertical translations of the loading station 3 platform 9 and those of the panel saw machine loading table 4, with movements whose extent is controlled, the feed line 1 transfers the various panels 2 taken from the stack 17 in series to the panel saw machine loading table 4, with a control based not on a number of panels preset according to the fixed thickness of a single panel 2, but a control of the total thickness of the panels 2 which may be defined either as the sum of panels with equal unit thickness, or the sum of the thicknesses of panels 2 with varying unit thicknesses, yet which form the total thickness h.

This is advantageous, allowing the successive transfer not only of individual panels 2 (for example, very thick), but also a plurality of panels 2 (for example, very thin) forming packs with a controlled height, in which the number of component panels 2 may be programmed on the control means 70 in inverse proportion to the unit thickness of the individual panels 2.

Obviously, depending on the thickness of the individual panel 2, or the total height of the pack of panels 2, the control means 70 may be programmed to control the translation of the loading table 4, so as to create, on the loading table 4, and depending on the height of the panels 2 (or relative packs of panels 2) passing through the infeed device 8, spaces in which the panels 2 come to rest after a short drop.

Since the infeed device 8 is structured so that it allows independent adjustment of the second rollers 8*s* of each roller unit 8*t*, the control means may control the separate activation of the hydraulic pistons 15 of the individual pairs of rollers 8*s*, 8*i*.

Thus, the feed line 1 according to the present invention, as well as advantageously being able to feed both individual panels 2 and packs of panels 2 of varying thickness and numbers, thanks to simple programming of the control means 70, can also allow the automatic passage from one series of panels 2 to the other, without necessitating stoppage of the feed line 1, nor the retooling of any physical devices on the line.

Figure 6:
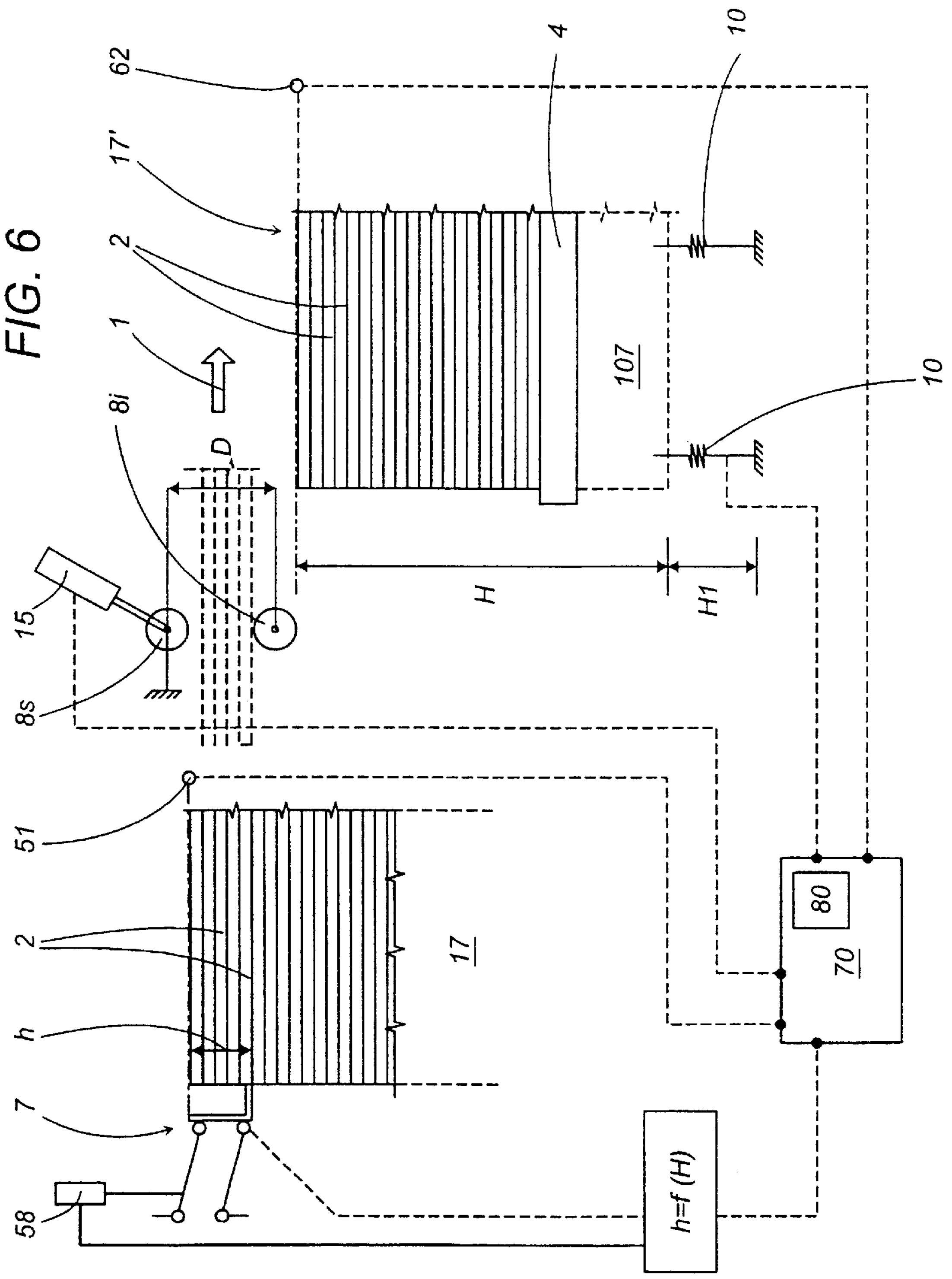
FIG. 6 is a schematic diagram of the operation of the feed line.

Another possibility which confirms the versatility of the transfer method according to the present invention is illustrated schematically in FIG. 6. In particular, it shows that the control means 70 can also control series of packs of panels 2 of different thicknesses, which may be combined in any way to obtain an exact total number N of panels to be fed to the panel saw machine.

More specifically, with reference to the diagram in FIG. 6 and, for the purpose of clarity, a numeric example, assuming that a stack 17 of panels consisting of a total of N=35 panels 2 of a given thickness must be formed on the loading table 4 on the panel saw machine, a suitably programmed CPU, labelled 80 and positioned on the control means 70, after establishing that the stack 17 to be formed on the loading table 4 on the panel saw machine must be formed, for example, by transferring in sequence eleven identical sets of three panels each and a twelfth set of only two panels, issues the appropriate command to the feed line 1, so as to:

translate the pushers 7 relative to the loading station platform 9 at each step of the sequence, so as to determine a relative lowering h of the pushers 7 depending on the total height H of the stack 17 to be formed on the loading table 4 on the panel saw machine;

control the third actuator means 15, so as to adapt the centre distance D between the pairs of rollers 8*s*, 8*i* to the thickness of the packs of panels 2 passing through the infeed device 8;

control the downstroke of the loading table 4 relative to photocell 62 by a measurement sufficient to allow it to accept the pack of panels 2 exiting the infeed device 8, at the same time reducing the distance over which they drop onto the loading table 4 to a minimum;

control the repetition of the above-mentioned operating steps eleven times with constant parameters and, for the twelfth time with different parameters;

control interruption of panel feed when measurement H1 from the ground is reached on the loading table 4, determined according to the total height H and calculated, for example, by the CPU relative to the total angle of rotation indicated by the encoder 62, or other equivalent systems, which controls the movement of the motor-driven screws 10.

The present invention may be subject to numerous modifications and variations, all encompassed by the original design concept. Moreover, all components may be replaced with technically equivalent parts.

I claim:

1. A method for feeding panels (2) to a panel saw machine, comprising the steps of:

engaging with a pusher (7) a pack of panels (2) belonging to a vertical stack (17);

moving said pack of panels (2) by means of said pusher (7) to an infeed device (8);

disengaging the pusher (7) from said pack of panels (2) when the stack of panels (2) is moved to the infeed device (8) and returning said pusher (7) to an initial position;

engaging said pack of panels (2) with at least two rollers (8*s*, 8*i*) of the infeed device (8) so that said pack of panels (2) is guided between the two rollers (8*s*, 8*i*) and moved toward the panel saw machine by at least one of the two rollers (8*s*, 8*i*) which is motor-driven;

translating vertically a loading table (4), located next to the infeed device (8) and defining a space into which the pack can be deposited; and, feeding the stack to the loading table (4) by means of the infeed device (8).

2. The method according to claim 1, wherein the thicknesses (h) of the panels (2) differs.

3. The method according to claim 1, characterized in that the step of translating the loading table (4) vertically is controlled by control means (70) according to the height (h) of the packs from the stack (17) passing through the infeed device.

4. The method according to claim 1, wherein the step of engaging with a pusher (7) a pack of panels (2) is performed after a step of moving the stack vertically relatively to the pusher (7).

5. The method according to claim 4, further comprising a step of controlling the vertical movement of the stack relatively to the pusher (7) by control means (70).

6. The method according to claim 5, wherein the control means (70) is programmed in such a way that they control the transfer in series of panels (2) corresponding with a thickness (h) of the stack (17) until a stack (17') is formed on the loading table (4) on the panel saw machine, the latter stack having a total height (H) and any preset total number (N) of panels, obtained as a suitable series of heights (h) of panels (2) transferred in sequence from the loading station (3) to the loading table (4) on the panel saw machine.

* * * * *